March 31, 1931.  W. BRZINSKI  1,798,189
STRAW SPREADER
Filed April 24, 1928   2 Sheets-Sheet 2
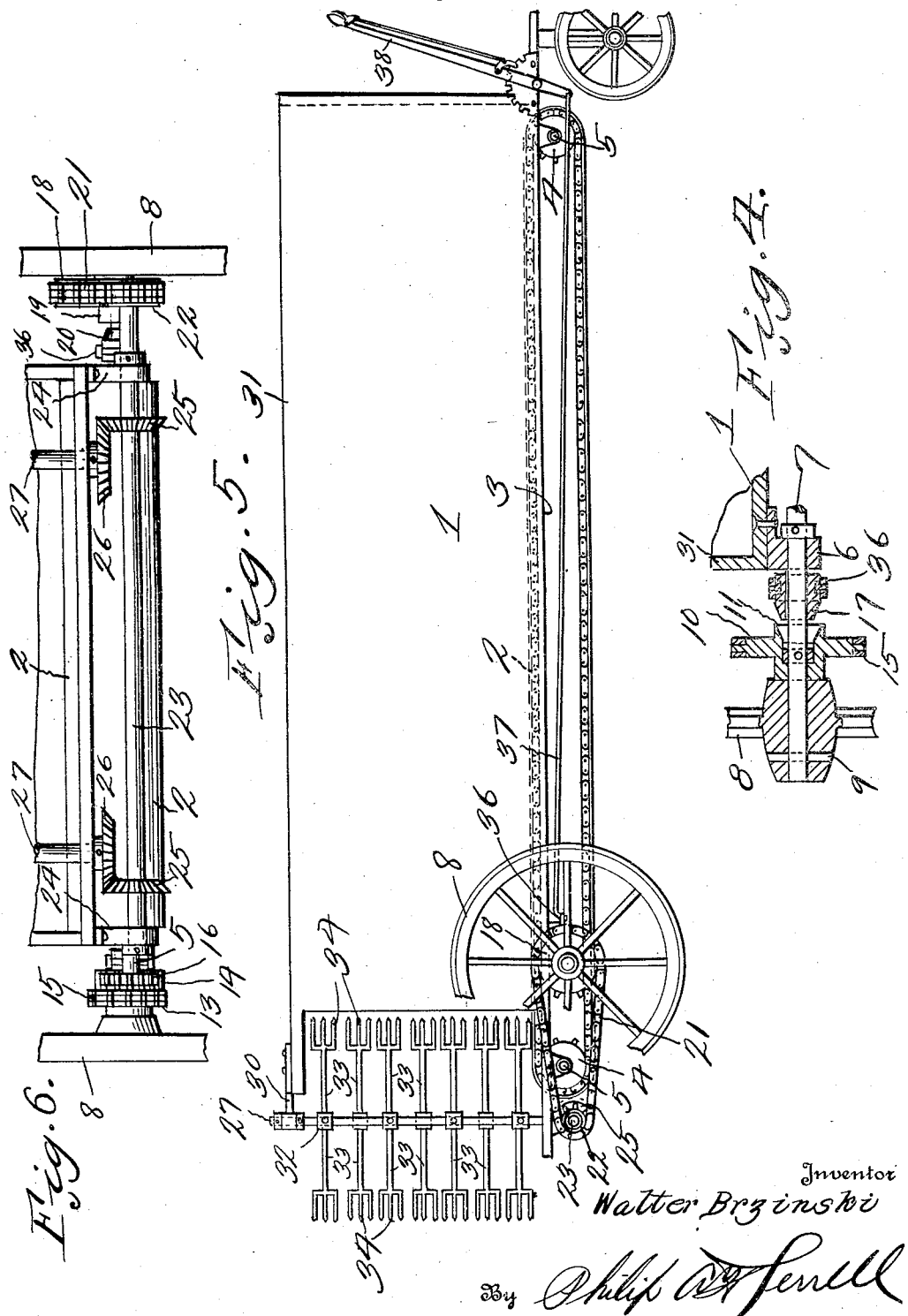
Inventor
Walter Brzinski Patented Mar. 31, 1931

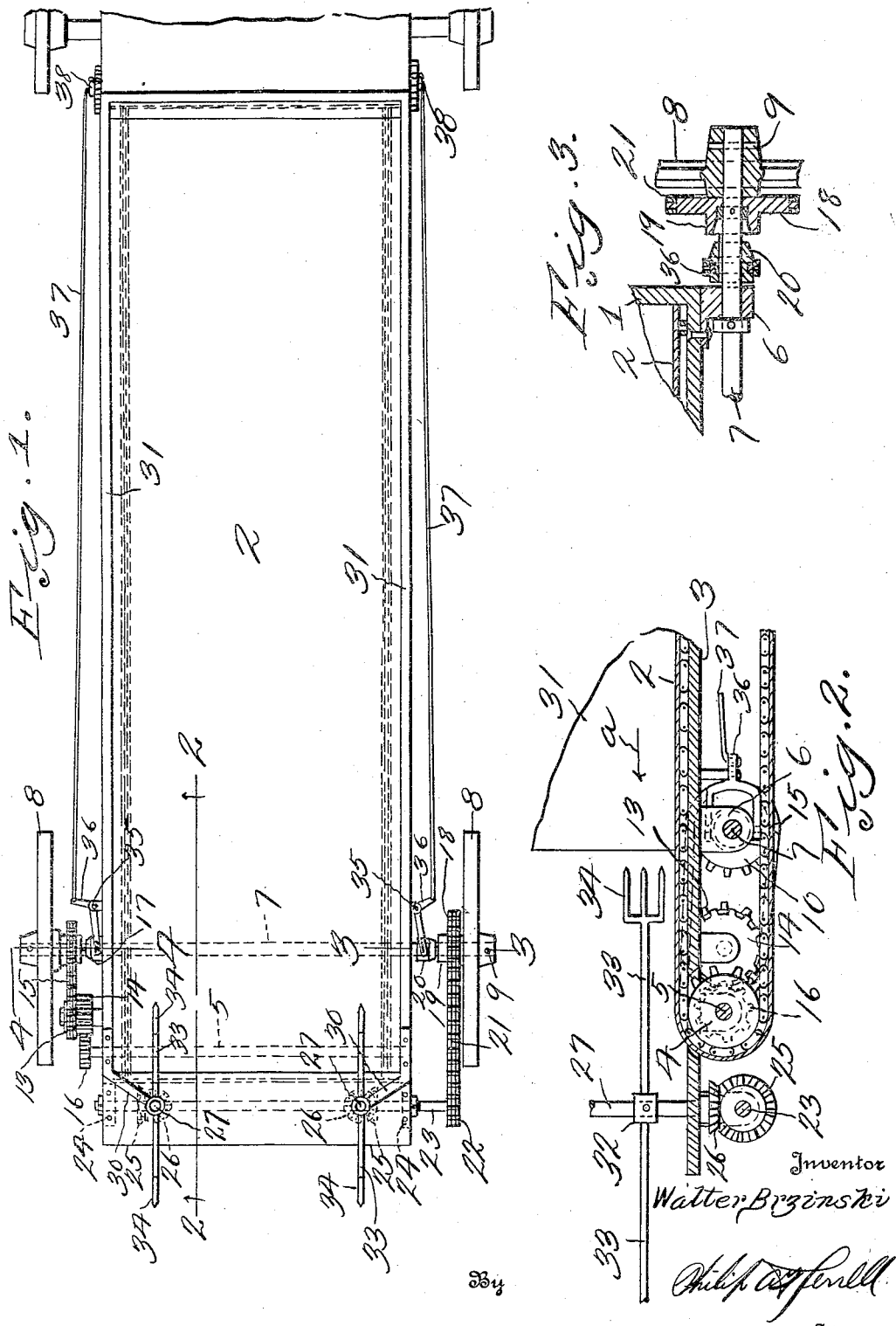

1,798,189

UNITED STATES PATENT OFFICE

WALTER BRZINSKI, OF FULLERTON, NEBRASKA

STRAW SPREADER

Application filed April 24, 1928. Serial No. 272,463.

The invention relates to straw spreaders and has for its object to provide a device of this character wherein rotatable spreading mechanism is disposed at the rear end of the body and driven from the ground engaging wheels and the body provided with an endless conveyor driven from the ground engaging wheels and forming means whereby straw may be fed rearwardly to the rotatable spreaders as desired for spreading purposes.

A further object is to provide controllable clutch means whereby the spreading mechanism and the body conveyor may be operated as desired.

A further object is to mount the spreader arms on vertically disposed shafts, the lower ends of which are provided with gear connections with a transversely disposed shaft disposed beneath the body and driven from the ground engaging wheels, and positioned whereby the gears will be protected from straw during the operation thereof.

A further object is to provide the spreader arms with forks, the forks of one vertical shaft being out of registration with the forks of the other shaft.

A further object is to rotatably mount the axle, and to provide the axle with driving sprockets rotatably mounted thereon and having driving connection with the conveyor and spreader mechanism and to slidably mount clutch elements on the axle, and to provide means whereby said clutch element may be moved into and out of engagement with clutch elements carried by the sprockets.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the straw spreader.

Figure 2 is a vertical longitudinal sectional view through the rear end of the spreader taken on line 2—2 of Figure 1.

Figure 3 is a vertical transverse sectional view taken on line 3—3 of Figure 1.

Figure 4 is vertical transverse sectional view taken on line 4—4 of Figure 1.

Figure 5 is a side elevation of the spreader, part of the wheel being broken away to better show the structure.

Figure 6 is a rear elevation of the spreader.

Referring to the drawings, the numeral 1 designates the body of the spreader and 2 an endless conveyor forming the bottom of the body, and on which straw rests. In operation the body 1 is filled with material and is fed rearwardly by mechanism hereinafter set forth. The conveyor 2 slides on the bottom 3 as clearly shown in Figure 2, and extends over sprockets 4 at the front and rear ends of the body and which sprockets are carried by transversely disposed shafts 5 beneath the body where they will not become clogged with material. It will be noted that only the upper side of the endless conveyor is exposed to the material and the operating parts are protected from the material incident to their location beneath the body.

Extending downwardly from the body at opposite sides thereof are brackets 6, in which brackets is rotatably mounted an axle 7. The outer ends of the axle 7 are provided with ground engaging wheels 8, which are secured to the axle, for instance by pins 9, whereby as the spreader moves over the ground the axle will rotate. Rotatably mounted on one end of the axle 7 is a sprocket 10 having a female clutch element 11, and extending over the sprocket 10 and over a sprocket 13, carried by an idle gear 14 is a sprocket chain 15, and the idle gear 14 meshes with a gear 16 carried by the conveyor shaft 5, therefore it will be seen that when the slidably keyed male clutch element 17 is in clutched engagement with the clutch element 11, the sprocket 10 will rotate with the shaft 7, thereby imparting rotation to the idle gear 14, the gear 16 and the shaft 5 for operating the endless conveyor whereby it will move in the direction of the arrow a, Figure 2 for feeding material rearwardly towards spreading mechanism hereinafter set forth.

Mounted on the other end of the axle 7 and rotatable thereon is a sprocket 18 having a clutch element 19, and which sprocket 18 is controlled by a slidably keyed clutch element 20 whereby the sprocket 18 may be locked to rotate with the shaft 7 or allowed to stand still during the rotation of the shaft 7 for operating as desired the spreader mechanism. Extending over the sprocket 18 is a sprocket chain 21, which sprocket chain extends rearwardly and over the sprocket 22 carried by the transversely disposed shaft 23 located beneath the body and supported in brackets 24, depending from the body. Shaft 23 has mounted thereon bevel gears 25, which bevel gears mesh with bevel gears 26 carried by the vertically disposed shafts 27 which extend through the bottom 3 of the body and have their upper ends supported by brackets 30 extending rearwardly and inwardly from the upper edges of the sides 31 of the body. Mounted on the vertically disposed shafts 27 are collars 32 having radially disposed arms 33, the ends of which terminate in forks 34, and it will be noted that the arms and forks of the shafts 27 are out of registration whereby they can overlap during their rotation. The arms 33 and forks 34 move in a horizontal plane during the operation of the device, and as the device moves forwardly over the ground the forks will dig the straw from the rear end of the load and will spread the same over the ground to the rear of the spreader, and the operator controls the clutch elements 17 and 20 for spreading as desired and for feeding additional straw rearwardly towards the spreading element, therefore it will be seen that clogging of the device will be prevented and the spreading may be positively controlled. It will be noted that the driving mechanism for the spreader element is disposed beneath the body, consequently protected from accumulation of straw.

Pivotally mounted at opposite sides of the body 1 at 35 are bell crank levers 36, to which are connected forwardly extending rods 37, the forward ends of which are connected to control levers 38, within easy reach of the operator whereby the operator can positively control the operation of the endless conveyor as well as the spreading mechanism at all times.

From the above it will be seen that a straw spreading machine is provided, which is simple in construction, positive in its operation, provided with means whereby the feeding conveyor or the spreading mechanism may be simultaneously operated or independently operated as desired, and all of the working parts of gear and shaft type are positioned beneath the body or to the sides thereof where they will be out of contact with the straw, consequently will not become clogged with straw during the spreading operation.

The invention having been set forth, what is claimed as new and useful is:—

A straw spreader comprising a body having its rear end open, a bottom carried by said body and extending beyond the rear open end of the body, the upper side of said bottom being in substantially the same plane for its entire length, a feeding conveyor beneath the bottom of the body, the upper flight of said feeding conveyor slidably engaging the upper side of the bottom for the entire length of said flight, sprockets beneath the bottom of the body and extending into openings therein and over which the feeding conveyor extends, transverse shafts carried by said sprockets and disposed entirely beneath the bottom, one of said shafts being disposed beneath the portion of the body extending beyond the rear end of the body and driving connections between said last named shaft and ground engaging means.

In testimony whereof I hereunto affix my signature.

WALTER BRZINSKI.